Patented Jan. 24, 1928.

UNITED STATES PATENT OFFICE.

1,657,081

BERT G. HARRINGTON, OF PRINCETON, KENTUCKY, ASSIGNOR OF THREE-FOURTHS TO RHEINER S. MASON, OF EDDYVILLE, KENTUCKY.

PUNCTURE-PROOF COMPOSITION AND PROCESS OF MAKING THE SAME.

No Drawing. Application filed October 5, 1926. Serial No. 139,761.

This invention relates to a composition especially adapted for preventing leakage of air from a puncture of an inner automobile tube. Its efficiency is in immediately engaging en masse the wall of a puncture hole made in the tire while in action and preventing the escape of air, thus holding the tire up from deflation for an indefinite period.

In preparing my compound I mix silica in a finely divided form which is or may be gathered from a private source (and I believe is marketed under the name of silex), and alumina, fine mica and soapstone, each in finely divided form, in the following parts or proportions respectively, 40, 30, 10, 10.

I intimately mix these several ingredients in the proportions noted until they are uniformly commingled. Then I mix them to a creamy mass in water and pour the mixture into a deep vat with sides extending several inches above the contained menstruum and place the metallic container on a hot fire with a loose cover to permit the escape of steam. I continue the boiling process until all the water is expelled, the final effect of the escaping steam at or near the closing of the operation being to cause the mass to fluff up into a very porous or flocculent consistency. The mass is then allowed to cool, when it is broken up into powder form through a sieve of about 100 mesh to the inch. The container is also dumped of fragments and dust, which is also put through the sieve. The sieved product is mixed with a coarser powdered mica and stirred until a uniform mixture results. If desired, for the purpose of a disguise a small quantity of ocher and gilt dust may be added. It is then prepared for the market in suitable cartons.

In using the composition the valve stem of the inner tube is removed and the finished product introduced, preferably 2 ounces for a 30 x 3 or 3½ inch tube, and 4 to 6 ounces for a balloon tire. The valve is then replaced and mounted on the wheel, and when the wheel is put into action the composition is distributed centrifugally throughout the tube and is carried by leak currents to the point where leak is, and where, by reason of the peculiar formations of the contributing elements in the composition and the consistency of the same by reason of my special process, it jams into an air-tight dam or plug that prohibits the escape of air, thus sustaining inflation and enabling the car to continue until a convenient time or place is reached for patching the tube. I further claim that by inserting this product into a punctured tube the same can then be pumped up and run indefinitely without patching. The powder must be applied in its perfectly dry form without use of liquid or viscous matter.

While my composition above described is composed of a plurality of different powders, each of them has a distinct function of a special value in connection with puncture-proofing qualities. The silica by reason of its sharp angles and irregular shapes of its minute particles gives it a critical quality of jamming and forming a non-slipping wall which interpenetrates the punctured tire fabric. The alumina by reason of its non-absorbent, soft and extremely fine texture fills the smaller interstices in the puncture. The mica by reason of its laminate form being flexible and elastic gives coverage and bulk to the other forms preventing their blowing through the puncture. The soapstone by reason of its anti-friction qualities causes the other ingredients to be brought into closer molecular relation and readily permits the propulsion of the other materials throughout the wall of the tube to enter and seal the puncture.

The aggregate of my composition forms an efficient creepy mass which under pressure wedges into an airtight dam or plug particularly efficient against leakage of air.

While I have herein described my composition and method of preparing same, I would have it understood that I do not limit myself to the specific proportions recited, but that the same may be varied within limits without departing from the efficiency of my compound.

Having thus described my invention, what I claim as new and desire to secure by Letters Patent is:

1. A puncture-proof composition containing a dehydrated mixture of finely divided silica and alumina in major proportion and mica and soapstone in minor proportion, intimately commingled and in fine powdered form.

2. A puncture-proof composition containing a dehydrated mixture of finely divided silica and alumina in major proportion and mica and soapstone in minor proportion, and a small proportion of coarsely ground mica intimately commingled.

3. A puncture proof composition consisting of a dehydrated mixture of forty parts silica, thirty parts alumina, ten parts each of fine mica and soapstone and a portion of coarse mica.

4. The process of making a puncture-proof composition for automobile tires, consisting in making an intimate mixture of silica and alumina in major proportions and mica and soapstone in minor proportions, mixing to a uniform consistency with water, boiling dry, and reducing to a fine powdered form.

BERT G. HARRINGTON.